United States Patent [19]

Torrey

[11] 3,752,961

[45] Aug. 14, 1973

[54] CIRCULAR TRACK CODED PATTERN READER

[76] Inventor: Bradford M. Torrey, Rutland St., Carlisle, Mass.

[22] Filed: Feb. 5, 1971

[21] Appl. No.: 112,959

[52] U.S. Cl. . 235/61.11 E, 250/219 D, 235/61.7 B, 235/61.12 N, 324/83 A, 340/146.3 K

[51] Int. Cl. .... G06k 7/14, G06k 19/06, G06k 9/06, G01n 21/30, G01r 25/04

[58] Field of Search .............. 235/61.11 E, 61.12 N, 235/61.12 R, 61.11 R, 61.7 B; 250/219 D, 219 DD; 340/146.3 K, 146.3 Z, 174.1 A; 324/83 A

[56] References Cited

UNITED STATES PATENTS

| | | | |
|---|---|---|---|
| 3,553,438 | 1/1971 | Blitz | 235/61.11 E |
| 3,585,367 | 6/1971 | Humbarger | 235/61.11 E |
| 3,414,731 | 12/1968 | Sperry | 250/219 D |
| 3,409,760 | 11/1968 | Hamish | 235/61.12 N |
| 3,418,456 | 12/1968 | Hamish | 235/61.11 E |
| 3,413,447 | 11/1968 | La Mers | 235/61.6 R |
| 3,691,350 | 9/1972 | Kuhns | 235/61.7 B |
| 3,636,317 | 1/1972 | Torrey | 235/61.12 N |
| 3,643,068 | 2/1972 | Mohan | 235/61.11 E |
| 3,646,324 | 2/1972 | Macey | 235/61.11 E |
| 3,676,645 | 7/1972 | Fickenscher | 235/61.11 E |
| 3,134,076 | 5/1964 | Haner | 324/83 A |
| 3,337,796 | 8/1967 | Hentschel | 324/83 A |
| 3,246,241 | 4/1966 | Colby | 324/83 A |

*Primary Examiner*—Maynard R. Wilbur
*Assistant Examiner*—Robert M. Kilgore
*Attorney*—Joseph S. Iandiorio and Dos T. Hatfield

[57] ABSTRACT

A label reading system for reading a circular coded label with a scan path within a predetermined tolerance range of eccentricity between the circular label and circular scan path including means for scanning the label and producing label scan signals representing the encoded information; a clock pulse generator for generating clock pulses; a clock control circuit for controlling the frequency of the clock pulse generator and a variable synchronizing circuit responsive to the label code signals and to the clock pulses for producing a phase signal representative of the difference in phase between the clock pulses and the label code signals; the clock control circuit being responsive to the phase signal to vary the frequency of the clock pulse generator to synchronize clock pulses with the label code signals as the label code signals vary within the tolerance range.

10 Claims, 15 Drawing Figures

CIRCULAR TRACK CODED PATTERN READER

FIELD OF INVENTION

This invention relates to the field of electronic data processing, and more particularly to electro-optical reading apparatus for acquisition of information stored in the form of a pattern of black and white areas.

BACKGROUND OF INVENTION

In both commercial and industrial operations there is frequent need to make an accurate accounting of items sold, received, relocated, or held in inventory. If the potential variety of items is large; or if item differences are not clearly discernable; each item may be marked or labelled with an identifying part number or stock number. Accounting by part or stock number is both precise and concise. However, any error in reading, recording, or processing even one digit of a lengthy stock number may have awkward if not costly consequence. In many operations the verbal, item descriptions accompany any documentation by stock number as a cross-check against errors. The extra cost of a double-check procedure may be incurred as one means to avoid erroneous identifications and recordings.

In some sales transactions the time required to process each item may represent a significant percentage of the net profit attributable to that item. Delays which inconvenience customers and limit the rate of sales may be experienced when the transactions require look-up procedures, price calculations, and/or the preparation of descriptive receipt forms.

SUMMARY OF INVENTION

The present invention therefore, has as its principal object the provision of apparatus for effecting the rapid and accurate reading of concise information such as may be marked on an item or label affixed to an item and intended to identify said item. With the availability of said apparatus, conventional electronic data processing units can readily be interconnected and/or programmed by those skilled in the art to complete many of the more burdensome tasks required or associated with previously mentioned operations.

For example, if all items for sale in a modern supermarket have been marked or labelled with an identifying stock number encoded in a manner described hereinafter, the check-out procedure at the front end of the supermarket can become efficient, accurate, and informative by employing a label reader, a magentic look-up memory to relate item and price, and an electronic computer to make calculations and control the flow of data to an electronic cash register and to a data recorder. Obvious benefits to the store owners accrue from elimination of item price marking and the obtaining of reliable sales information.

Other objects of the present invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

DISCLOSURE OF PREFERRED EMBODIMENTS

For a fuller understanding of the nature and objects of the invention, reference should be had to the following detailed description taken in connection with the following drawings in which.

The present invention generally comprises a separately packaged viewer assembly, a main electronic circuitry assembly, various electrical power supplies, interconnecting cables, and labels or patterned surfaces encoding information stored thereupon for retrieval by the reading apparatus. The viewer generally comprises a housing, a light source, a photoelectric sensor, one or more light path defining elements, an electronic amplifier, and electronic or mechanical means for effecting a circular path, scanning motion of the small viewing area, hereinafter termed the viewing spot, governing the instantaneous level of the electrical response of the aforementioned sensor.

The labels or patterned surface markings readable by apparatus described hereinafter are provided with a plurality of truncated sector shaped areas of equal size and angular extent and so arranged as to form a complete annular ring. Each of said truncated sector shaped areas has a photo-electrically sensible characteristic facilitating classification into one of two categories considered to represent the two binary values one and zero. A preferred means facilitating said classification will cause some truncated sector shaped areas to be black representing the binary value zero while remaining truncated sectors are left white denoting the binary value one. Information is encoded in the sequence of contiguous, binary propertied, truncated sectors. The annular pattern area further includes one unique sequence of binary propertied, truncated sectors separating the two ends of the information sequence. Allowable encoding schemes and separating sequences do not result in long sequences of like propertied, truncated sectors.

The main electronic assembly generally comprises implementation of analog and digital circuits selected and interconnected to recover the binary information sequence of the pattern from the time varying electrical signal produced by the viewer when scanning a pattern. Further circuit means are provided to test the validity of retrieved information and to prevent any non-intentional repetition of a valid reading.

Power sources, cables, circuit boards, various electronic hardware, and generally a cabinet are provided in any implementation of this invention however these practical considerations are well known to those skilled in the electronic art and will not be described further herein. Although not a part of this invention various auxilliary devices and/or circuits may be provided such as a kayboard for manual data entry, an information display, and/or signaling means to prompt an operator.

Figure 1:
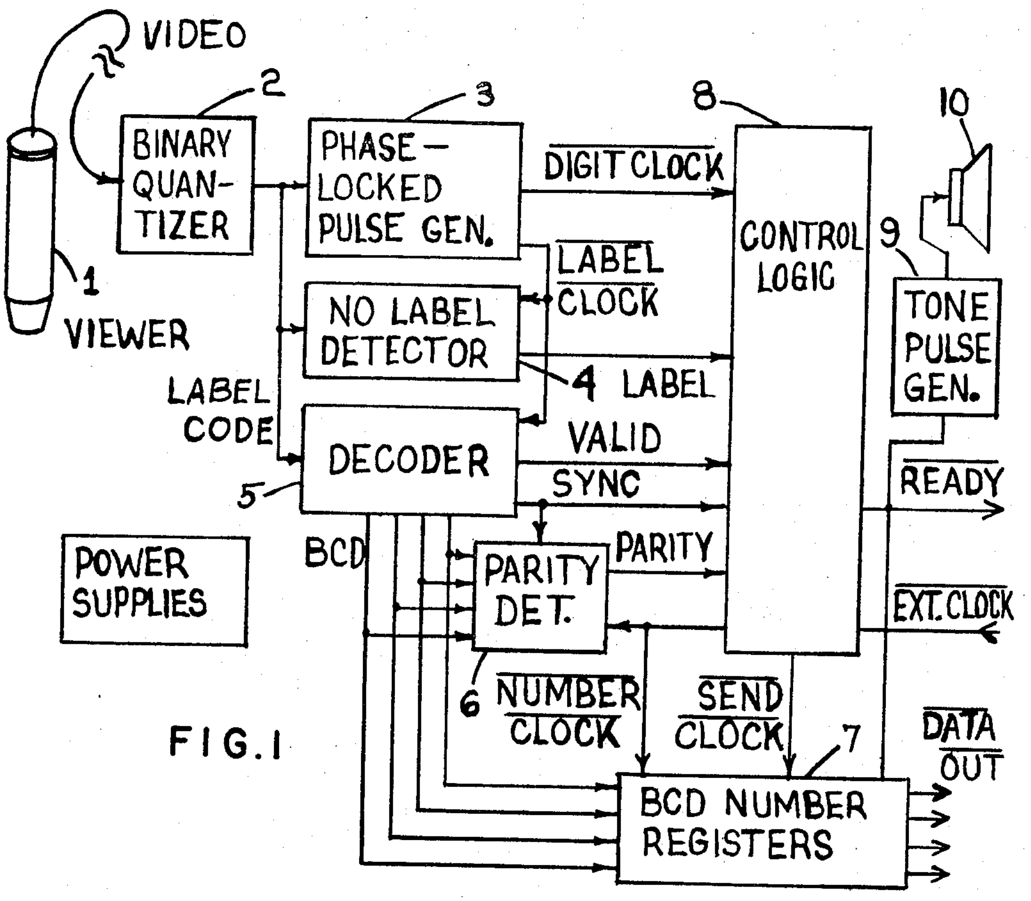
FIG. 1 is a functional block diagram for reading apparatus comprising one embodiment of the invention.

Referring now to the drawing there will be seen in FIG. 1 a functional block diagram representing the signal flow for a preferred embodiment of this invention. Viewer 1 is the means for scanning a generally circular path around a suitably positioned label and generating a time varying electrical signal indicative of the pattern reflectance at a single small spot traversing said path. Binary quantizer 2 is functionally equivalent to a Schmitt multivibrator and is required to produce a logic level 1 output voltage when the video input lies above a threshold value and a logic level 0 output voltage when the video input falls below the threshhold value. This function is implemented most directly with an integrated circuit, comparator such as the Fairchild type 710 device. The phase-locked pulse generator 3 produces two continuous trains of narrow timing pulses controlled by means of a feedback loop such that the timing of one train termed the DIGIT CLOCK coincides fairly closely with the crossing of pattern sector boundaries by the viewing spot. Pulses in the other train, termed the LABEL CLOCK, are generated to occur when the viewing spot is near the center of each sector. No-label detector 4 responds to an absence of reflected light for an interval of time longer than can result from the traverse of three consecutive black sectors. Decoder 5 is a serial-in-parallel-out shift register with combination logic provided to respond to valid code sequences including the separating sequence hereinafter termed the synchronizing code. In this embodiment of the invention the pattern encoding scheme and the apparatus provide for storage and retrieval of numerical information originating in a decimal format. Parity detector 6 maintains a running sum of each newly decoded sequence now in the 8421 binary coded decimal (BCD) format with the bit complement of the previous sum. The last sequence of six sectors is the encoding of the parity number. Receipt of the parity number is required to produce an arbitrary result or the reading is rejected. The BCD number registers 7 accumulate the label information in BCD format for release after the parity check to the using or recording equipment. Control logic 8 establishes and monitors the overall sequence of operations. Tone pulse generator 9 when initiated by control logic 8 produces a fixed duration, audio frequency signal that is converted into an audible tone by loudspeaker 10. Circuitry for implementation of tone pulse generator 9 is of conventional design not further described herein.

Figure 2:
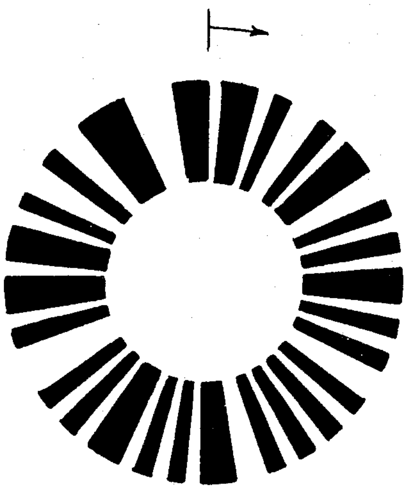
FIG. 2 is an enlarged view of a circular track, coded pattern readable by apparatus comprising one embodiment of the invention.

FIG. 2 provides one example of a preferred pattern format comprised of 72 truncated sectors each having an angular extent of 5° for a combined total of 360°. Said truncated sectors of which 36 are white and 36 are black are arranged to form an annular ring shaped area having an outer diameter that is twice the length of an inner diameter. The information represented by this pattern is the 10 digit decimal number 0261686190. The parity digit, following the information, has the value 8. Consecutive sequences of six truncated sectors are provided for synchronization purposes and each of the decimal digit representations. The preferred scanning direction is clockwise. In FIG. 2 the initial information sequence starts at the angle corresponding to twelve on a clock face.

Figure 3:
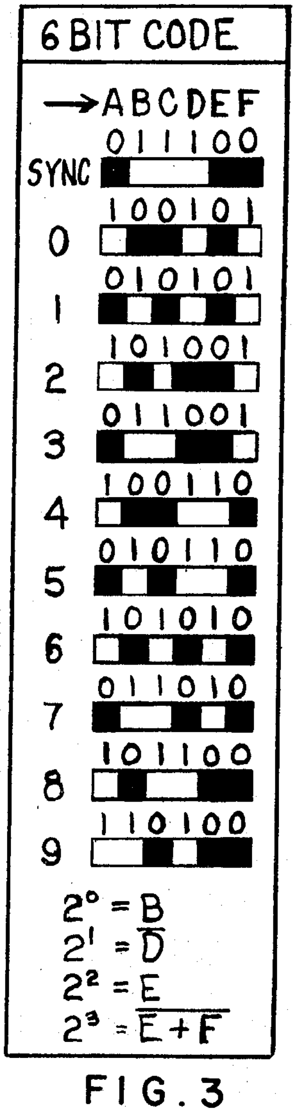
FIG. 3 is a chart detailing the encoding scheme followed in the preparation of FIG. 2.

The chart in FIG. 3 shows the preferred encoding scheme employed to prepare FIG. 2. The synchronizing sequence is unique within this scheme in that no combination of sequences shown in the chart will include any combination of six consecutive truncated sectors constituting a spurious synchronizing code. Further, no combination of the sequences can produce a series of like-valued sectors longer than three.

This encoding scheme exhibits the useful property that for any resultant pattern the ratio of white sectors to black sectors is fixed, unity in this case. This property is useful inasmuch as any single cause for accidental damage to a label as by soiling or abrasion cannot change one valid sequence into another. Contrasting damage effects in close together sector pairings are not expected with any significant frequency; and then, a numerical parity test should indicate the presence of an error.

Figures 4, 5:
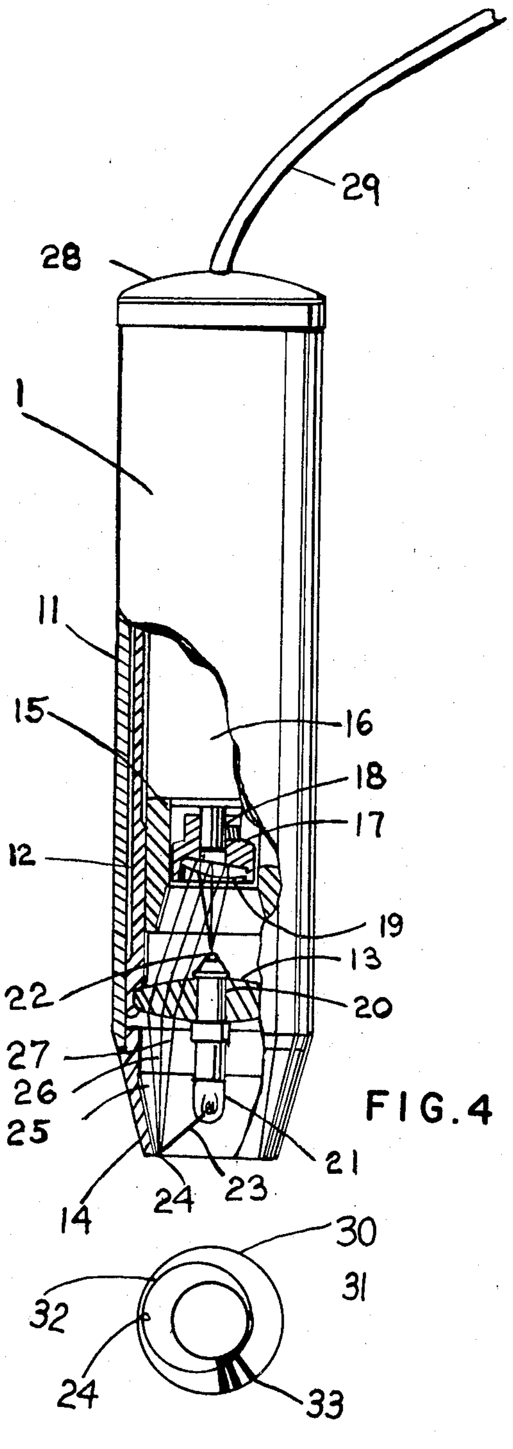
FIG. 4 is a cutaway view of a viewer assembly employed in one embodiment of this invention.
FIG. 5 is a view of a scanning path superimposed on a pattern outline.

Referring now to the drawing of FIG. 4 there will be seen a cutaway and sectioned view of viewer 1 employed in one embodiment of this invention. Handle 11 is an elongated hollow element having a cylindrical inner surface. Hollow sleeve 12 is adjusted longitudinally within said handle to fix the distance between lens 13 mounted at one end of sleeve 12 and the viewing aperture plane at the smaller end of hollow nose piece 14 which is affixed to and serves as a tapered down extension of handle 11. Adapter sleeve 15 is adjusted longitudinally within hollow sleeve 12 and supports end mounted electric motor 16 which is preferrably of the hysteresis synchronous type to obtain smooth, constant speed operation. Adapter bushing 17 is secured to shaft 18 of said motor and supports lens-mirror 19 in a tilted and slightly off-center position relative to the rotational axis of said electric motor. Lens-mirror 19 is a plano-convex lens converted into a second surface mirror by mirror coating the flat side. It has optical properties similar to a double convex lens except for the location of any real image. Lens 13 has an axial through hole in which double socket 20 is secured. Said socket makes electrical connection to and supports lamp 21 on the viewing aperture side of lens 13. Lamp 21 is preferably a low voltage, long life, incandescent lamp such as the CMT-7381 with a bi-pin base available from Chicago Miniature Lamp Works. Said socket 20 also makes electrical contact to and supports photo-electric sensor 22 positioned to view lens-mirror 19. Said sensor is preferably a silicon photo-transistor with a small acceptance window and high sensitivity such as the MRD 200 device available from Motorola.

Except for adapter bushing 17 and lens-mirror 19, all elements of the viewer mentioned thus far exhibit circular symmetry about one common axis.

By design and minor adjustment of adaptor sleeve 15 relative to sleeve 12 the separation between the aperture of sensor 22 and lens-mirror 19 is made approximately equal to the focal length of said lens-mirror. By design and minor adjustment of sleeve 12 relative to handle 11 the separation between lens 13 and the plane of the viewing aperture is made approximately equal to the focal length of said lens. By design the axial distance between the plane of the viewing aperture and the filament of lamp 21 is made approximately equal to the radius of the circular viewing aperture. Light energy reaching the peripheral area of the aperture arrives at approximately a 45° angle with respect to the aperture plane as typified by light ray 23. When the plane of the viewing aperture sensibly coincides with the surface of a label or pattern area, as is the preferred relationship for reading, some of the light energy incident upon viewing spot 24 is diffusely reflected in a direction generally normal to the plane of the aperture as typified by light rays 25, 26, and 27 emenating from a central point within the viewing spot. The small bundle of light rays leaving said point is substantially collimated and redirected by lens 13 such that normal ray 26 would intersect the optical axis of lens 13 if not intercepted by lens-mirror 19. Said ray 26, however, is refracted by the first surface of lens-mirror 19, reflected at a point on the second surface mirror defined in part by the optical axis of lens-mirror 19, and after a second refraction when emerging from said lens-mirror, reaches the center of the entrance window of photo-electric sensor 22 by way of a path which coincides with the axis of symmetry noted previously. Other light rays in said bundle as typified by rays 25 and 27 follow related paths which converge finally to intersect the path of light ray 26 at the window of photo-electric sensor 22. Viewing spot 24 can now be redefined as that small area on a viewing surface which is imaged within the aperture area of the photo-electric sensor. When the shaft of electric motor 16 rotates at a constant speed, the radial direction of the viewing spot relative to the axis of symmetry will change at a constant angular rate; and the distance of said spot from said axis will be constant.

Lens-mirror 19 may be apertured in an eliptical manner such that the longer aperture diameter has the same radial direction as the viewing spot thereby providing poorer definition of the viewing spot in a radial direction. Thus some optical distortion provides the means to elongate the viewing spot and thereby increase the effective area without commensurate loss of angular resolution in the reading of a label.

Not shown in FIG. 4 there is an internal compartment between the rear end of motor 16 and end cap 28. This compartment is provided to house an electronic signal amplifier and terminal connections to multi-conductor cable 29. Said amplifier is provided to strengthen the electrical output signal from photo-electric sensor 22 to a level substantially greater than probable interference levels which may be picked up on the signal leads in cable 29 either from power leads in said cable or by coupling to stray electric and/or magnetic fields. Said amplifier may be of conventional design for low noise amplification of low level signals. Also not shown in FIG. 4 are the fine wires laid in part along the surfaces of lens 13 to connect terminal points on socket 20 with tie points in the aforementioned internal compartment. Said fine wires in traversing the surfaces of lens 13 are well displaced from object and image planes to provide only small reductions in the resolution and light gathering characteristics of the viewer.

Referring again to light rays typified by rays 23, 25, 26 and 27 the combination of a 45° angle of incidence and a normal direction of diffuse reflection has been found through experience to provide a reflected light return that is highly responsive to surface and subsurface color, relatively insensitive to surface gloss, and conserving of the available light energy. With the above stated light paths the patterns can be read through many of the plastic film overwraps employed to package retail merchandise.

Referring now to FIG. 5 there will be seen the outline of a pattern area as indicated by outer circle 30 and inner circle 31. Said outline is drawn to the scale employed for FIG. 4. Viewing spot 24 traverses path 32 which crosses all binary encoded areas typified by truncated sector 33 despite substantial misalignment of the viewing path relative to the center of the pattern area. Path 32 is the line of intersection of a circular cylinder with the surface of the pattern. Said line of intersection may be non-circular by reason of pattern surface inclination or curvature. Although the angular traverse rate of electric motor 16 may be constant, the rate of sector crossings by viewing spot 24 will generally vary above and below the average value with a relatively smooth rate variation.

Figures 6, 7:
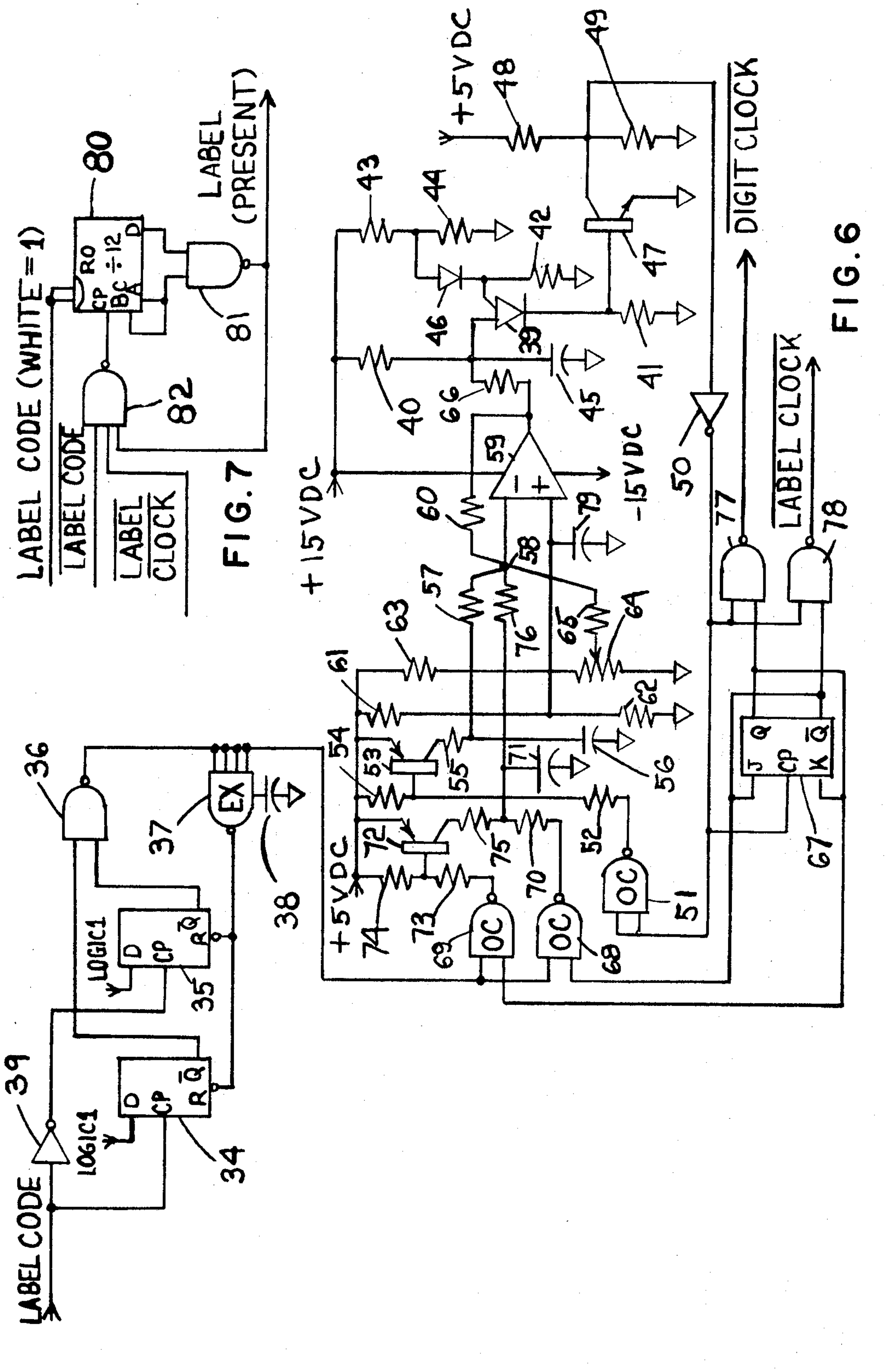
FIG. 6 is a schematic and logic diagram for a phase-locked pulse generator.
FIG. 7 is a logic diagram for a no-label detector.

FIG. 6 shows the arrangement of electronic circuit elements comprising phase-locked pulse generator 3. In describing digital logic circuits, positive logic terminology is used. Digital logic elements are preferably of the 740ON series available from Texas Instruments unless otherwise stated.

The LABEL CODE from binary quantizer 2 is assumed initially to be in the zero state denoting that viewing spot 24 lies within a binary zero encoded truncated sector. It is further assumed initially that D type flip-flops 34 and 35 are both in the reset state. When viewing spot 24 moves to a binay one encoded, truncated sector the LABEL CODE makes an abrupt transition to the one state, thereby causing the $\overline{Q}$ output from flip-flop 34 to go to the zero level. Said zero level independently causes the output of nand gate 36 to switch from the zero to the one state. Diode input nand gate 37 which is preferably an 8416 type device available from Signetics has an expansion node tied to the ungrounded side of capacitor 38. Said capacitor cannot be charged rapidly through an internal pull-up resistor in said gate 37, hence the output of gate 37 does not immediately switch to the zero state. When gate 37 finally switches to the zero state, flip-flop 34 is reset thereby removing the zero input to gate 36 which then reverts to a zero output state. The purpose of this arrangement is to generate a narrow, fixed duration, rectangular pulse having its leading edge coincident with each rising edge of the LABEL CODE waveform. The LABEL CODE is inverted by inverter 39 and applied to the clock input of flip-flop 35. In similar fashion a rectangular pulse of the same fixed duration is generated such that the leading edge coincides with the falling edge of the LABEL CODE waveform. The output of gate 36 is thus a narrow, fixed duration, positive going, pulse initiated by traverse of viewing spot 24 across each boundary between unlike encoded pattern elements.

Referring now to programmable unijunction device 39, said device in conjunction with resistors 41 through 44, capacitor 45 and diode 46 comprise a free-running pulse generator of conventional design. In brief, capacitor 45 is charged by current flow through resistor 40. When the potential across capacitor 45 reaches the same value as that established at the anode of diode 46 by resistors 43 and 44, the unijunction device conducts heavily to discharge capacitor 45 through resistor 41. When discharge is nearly complete, conduction through the unijunction device ceases and capacitor 45 again charges toward the supply voltage. Resistor 42 assures a small current flow through diode 46. The voltage across diode 46 varies with temperature in similar fashion to the emitter diode potential of unijunction device 39, thereby minimizing pulse frequency variations with temperature changes. The surge current through resistor 41 when capacitor 45 is discharges will forward bias NPN transistor 47 such that its collector falls to a logic level. When conduction ceases through resistor 41, transistor 47 reverts to the one state aided by pull-up resistor 48 but prevented from reaching the five volt supply level by a small current flow through resistor 49. The output of transistor 47 is a narrow negative going pulse with a steep falling edge and a slower return edge. This pulse after inversion by inverter 50 exhibits fast rise and fall times. The output of inverter 50 is connected to both inputs of nand gate 51 which has an open collector output stage. Gate 51, via resistor 52, turns on PNP transistor 53 for short, relatively fixed periods of time corresponding to the discharge periods of capacitor 45. At all other times transistor 53 is biased off by resistor 54. During the conducting periods of transistor 53 collector current flows through resistor 55 into the ungrounded end of capacitor 56. The only discharge path for said end of capacitor 56 is through resistor 57 into summing point 58 of operational amplifier 59. Said summing point is held by inverse feedback current partly through resistor 60 to hold a nearly constant voltage that is nearly identical to that at the non-inverting input of said amplifier as set by identical resistors 61 and 62 connected in series across the 5 volt supply. Amplifier 59 which may be a type 741 device available from Fairchild produces within its capabilities an output voltage swing in the direction and to the extent necessary to supply a balancing current input to summing point 58. The potential divider consisting of resistor 63 and potentiometer 64 is adjusted to remove current via resistor 65 from summing point 58 just equal to the current into said summing point via resistors 57 and 60 when the frequency of pulses generated by the unijunction circuit is twice the average sector crossing rate. If said pulse frequency were to increase there would be more charging pulses supplied to integrating capacitor 56 per unit time thus tending to raise its potential and thereby deliver more current to the summing point. The output of amplifier 59 would tend to drop and resistor 66 would tend to divert more of the current through resistor 40 away from capacitor 45 thereby lowering the charging rate of said capacitor and the pulse rate.

Flip-flop 67 is connected to function as a divide-by-two counter driven by the output of inverter 50. Nand gates 68 and 69 are open collector gates preferably exhibiting low leakage characteristics in the one state. A suitable device is the type 8481 available from Signetics. When the $\overline{Q}$ output of flip-flop 67 coincides in time with a pulse from nand gate 36, nand gate 68 will conduct thereby providing a discharge current path through resistor 70 that tends to lower the voltage on capacitor 71. When the Q output of flip-flop 67 coincides in time with a pulse from nand gate 36, nand gate 69 will conduct thereby forward biasing PNP transistor 72 via resistor 73. Transistor 72, normally biased off by resistor 74, will when on provide a charging current path through resistor 75 that tends to raise the voltage on capacitor 71. The ungrounded end of capacitor 71 is connected via resistor 76 to summing point 58. Nand gate 68 termed the late gate, when turned on tends to result in a higher pulse rate from unijunction device 39. Conversely when gate 69, termed the early gate, conducts the result is a lower pulse rate from unijunction device 39. Phase-lock occurs when pulses from gate 36 are centered in time with respect to the negative going edge of the Q output from flip-flop 67.

Flip-flop 67 changes state on the falling edge of the clocking pulse. Therefore nand gate 77 utilizes the Q output from flip-flop 67 to select every other pulse from inverter 50 to become the $\overline{\text{DIGIT}}$ $\overline{\text{CLOCK}}$ timing pulses which coincide generally with sector boundary crossings by viewing spot 24. Similarly nand gate 78 utilizes the $\overline{Q}$ output of flip-flop 67 to select alternate pulses from inverter 50 to become the $\overline{\text{LABEL}}$ $\overline{\text{CLOCK}}$ timing pulses which coincide generally with sector centerline crossings by viewing spot 24.

Capacitor 79 is provided to bypass the non-inverting input of amplifier 59.

FIG. 7 shows the arrangement of logic elements comprising no-label detector 4. When viewer 1 is lifted away from a reflecting surface the LABEL CODE will be zero and the $\overline{\text{LABEL}}$ $\overline{\text{CODE}}$ will be one. Assuming that divide-by-12 counter 80 was reset by the earlier one level of the LABEL CODE, the output of nand gate 81 will be one. Negative going pulses on the $\overline{\text{LABEL}}$ $\overline{\text{CLOCK}}$ line are then inverted by nand gate 82 and are counted by counter 80. Provided that the $\overline{\text{LABEL}}$ $\overline{\text{CODE}}$ remains zero, said clock pulses will advance the counter until a count of nine is reached. At this time both the A and the D outputs of said counter are ones and the output of gate 81 goes to zero. Said zero as an input to gate 82 is sufficient to hold the output of gate 82 at the one level thereby preventing any change in count. This condition remains until the counter is reset by a one level on the LABEL CODE line.

Figure 8:
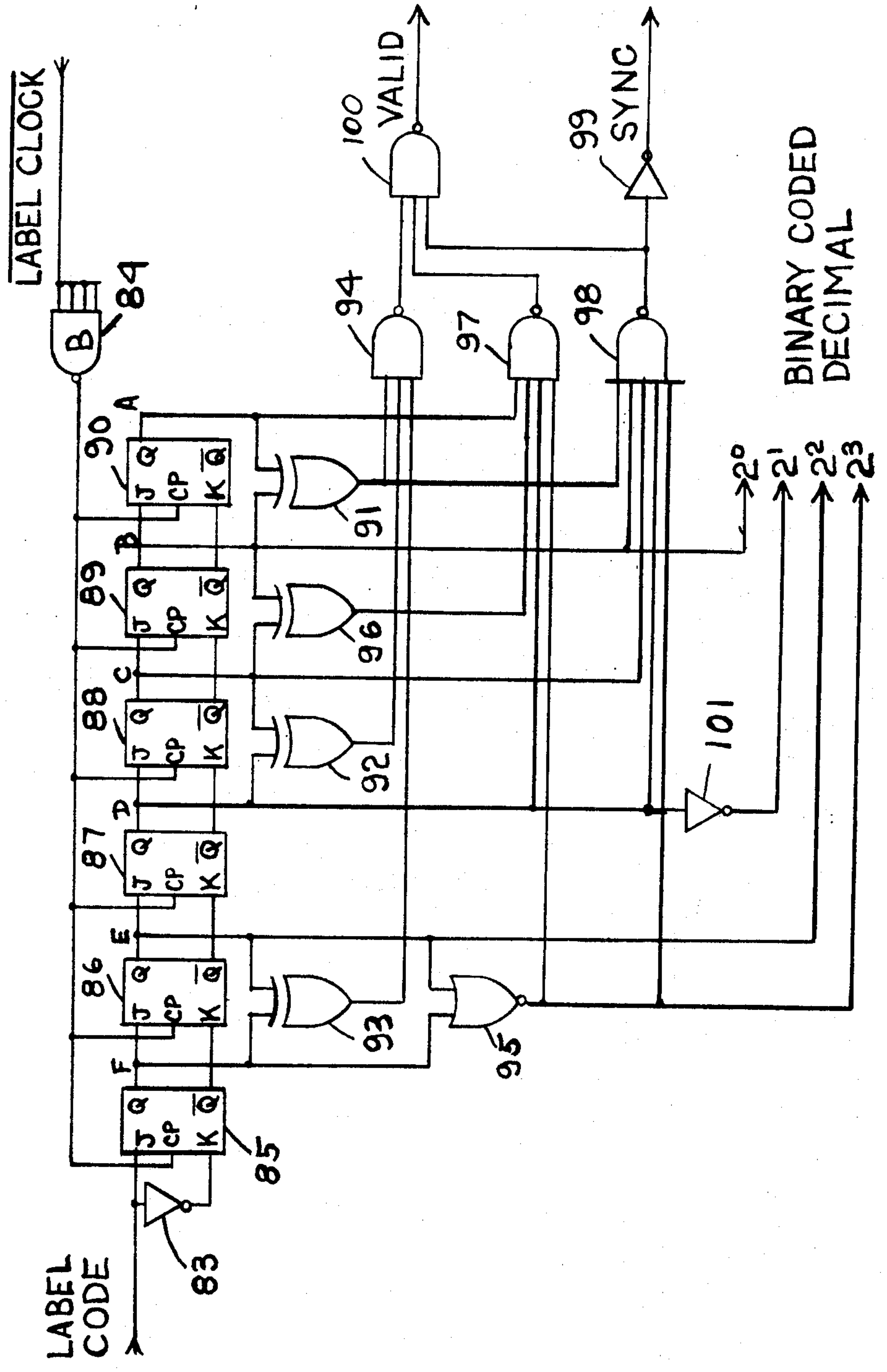
FIG. 8 is a logic diagram for a decoder.

FIG. 8 shows the arrangement of logic elements comprising decoder 5. The LABEL CODE is applied at the J input of the first stage of a six stage serial-in-parallel out shift register. The LABEL CODE is complemented by inverter 83 and applied at the K input of said first stage. LABEL CLOCK pulses from the output of buffer nand gate 84 are applied at the clock pulse inputs of all six register stages. Flips-flops 85 through 90 comprise the shift register. With each clock pulse the state of the LABEL CODE is sampled and stored in flip-flop 85; and the previous contents of flip-flops 85 through 89 are stored in their respective following stages. Letter symbols A through F identify the Q outputs of flip-flops 85 through 90 taken in reverse order. These letters correspond to the column headings in FIG. 3. When the outputs of exclusive or gates 91 through 93 are all ones the code sequence in the register represents one of the zero through seven decimal combinations. A zero at the output of nand gate 94 denotes one of said decimal combinations. Nor gate 95 has a one output for code sequences corresponding to the SYNC code and the decimal values eight and nine and for many invalid code sequences. Exclusive or gate 96 has a one output for code sequences corresponding to the decimal values eight and nine and for many both valid and invalid sequences. However nand gate 97 responding to outputs from gates 95 and 96 and from flip-flops 87 and 90 has a zero output only when the register sequence represents either a decimal eight or a decimal nine. Nand gate 98 requires one outputs from flip-flops 87, 88, and 89 and from gates 91 and 95 in order to denote the SYNC code presence with a zero output. Inverter 99 complements the output of gate 98 to generate the SYNC signal. If any input to nand gate 100 is a zero the code sequence is known to be one of those shown in FIG. 3. Inverter 101 which complements the output from flip-flop 87 is the only additional element required to obtain the 8421 binary coded decimal format.

Figure 9:
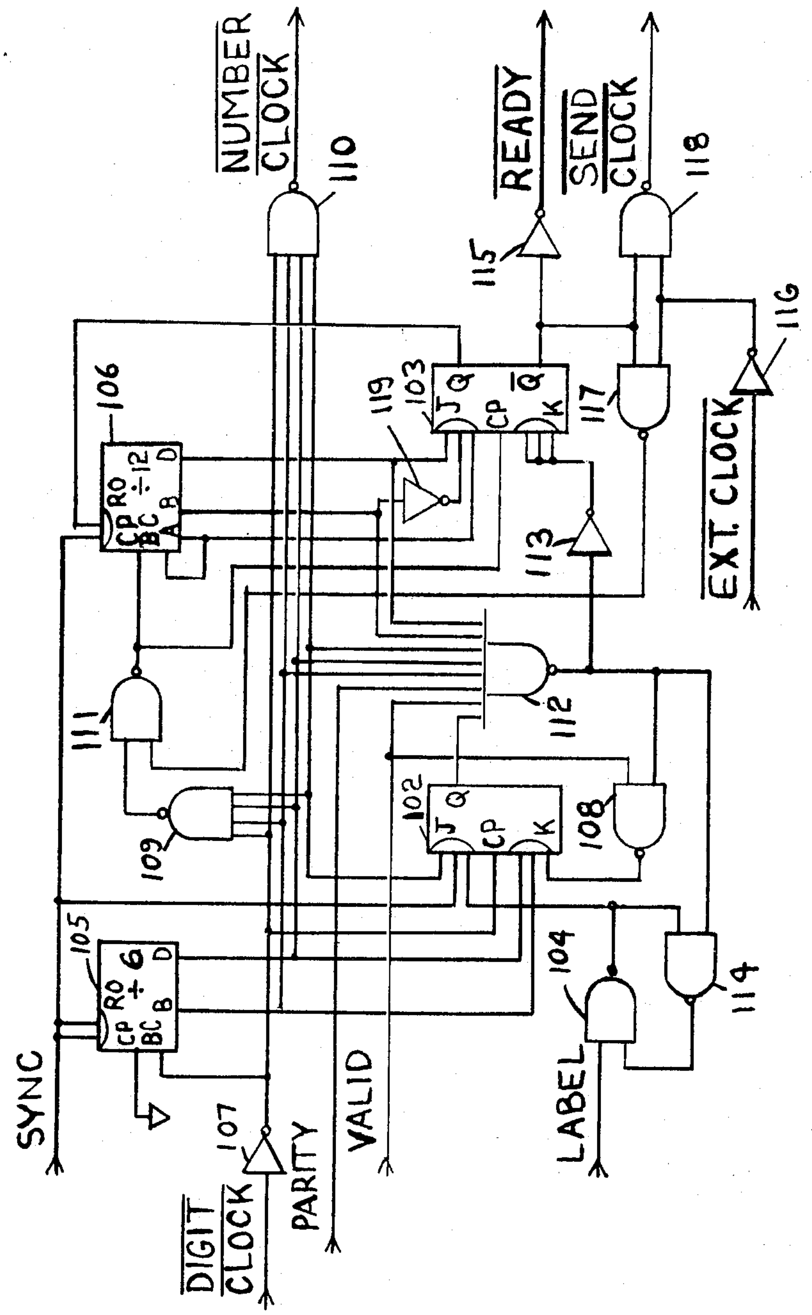
FIG. 9 is a logic diagram for control logic.

FIG. 9 shows the arrangement of parts comprising control logic 8. Assume initially that the Q outputs of flip-flops 102 and 103 are at zero and one respectively and that the output of nand gate 104 is at one. When the SYNC line goes to one counters 105 and 106 are reset to zero. Inverter 107 complements the $\overline{\text{DIGIT CLOCK}}$ to provide clocking pulses into counter 105 and flip-flop 102. One of said clocking pulses will occur midway in the duration of the one value on the SYNC line. Under the assumed initial conditions flip-flop 102 changes to the one state at the Q output with the falling edge of later said clock pulse. Counter 105 remains reset at a zero count by reason of the one level SYNC value on the reset inputs. Subsequent clocking pulses cause counter 105 to count up to five, go to zero on the sixth count and to continue in this fashion. Just prior to each sixth count, decoder 5 will contain an entirely new encoding sequence. If said sequence is not valid the VALID line will be at zero which is sufficient cause for the output of nand gate 108 to go to one. With the five count from counter 105 flip-flop 102 reverts to the zero state at the Q output at the end of the sixth clocking pulse. If on the other hand, the VALID line is at the one level flip-flop 102 is unaffected. The sixth clocking pulse appears in inverted form at the outputs of gates 109 and 110. The negative-going pulse from gate 109 is made positive-going by nand gate 111 and applied to increment counter 106. When counters 105 and 106 reach counts of five and ten respectively the sequence in decoder 5 denotes the parity number. If PARITY and VALID lines are both high, the output of nand gate 112 will be low which causes the outputs of nand gate 108 and inverter 113 to both go high. The zero output level from gate 112 transitions the set-reset flip-flop formed by nand gates 114 and 104 such that the output of gate 104 becomes low. The Q outputs of flip-flops 102 and 103 will both go to the zero state at the end of the next clock pulse. Flip-flop 103 is the mode control means. With Q in the zero state gates 109, 110, 112 are disabled. Inverter 115 complements the $\overline{Q}$ output of flip-flop 103 to produce a zero level on the $\overline{\text{READY}}$ line to an external device. Said device is required to respond with a train of negative-going clock pulses on the $\overline{\text{EXT. CLOCK}}$ line. Said clock pulses are complemented by inverter 116, nanded with $\overline{Q}$ from flip-flop 103 in gates 117 and 118. The output from gate 117 is sufficient to produce a positive set of clock pulses at the output of gate 111. Counter 106 had reached a count of eleven and goes to a count of 0 after arrival of the first external clock pulse. After arrival of 10 external clock pulses counter 106 has reached an indicated count of nine. The J inputs to flip-flop 103 from counter 106 and inverter 119 are ones; hence the Q output from 103 changes to one at the end of the eleventh external clocking pulse. When $\overline{Q}$ of 103 goes to zero the $\overline{\text{READY}}$ signal from inverter 115 goes to one. The external device is instructed thereby to discontinue transmission of clock pulses. The assumed initial conditions now prevail except that the output of gate 104 will be zero unless at some time after completion of the reading the LABEL line dropped to zero. In this manner gates 104 and 114 prevent an inadvertant repeat reading of one pattern.

Figure 10:
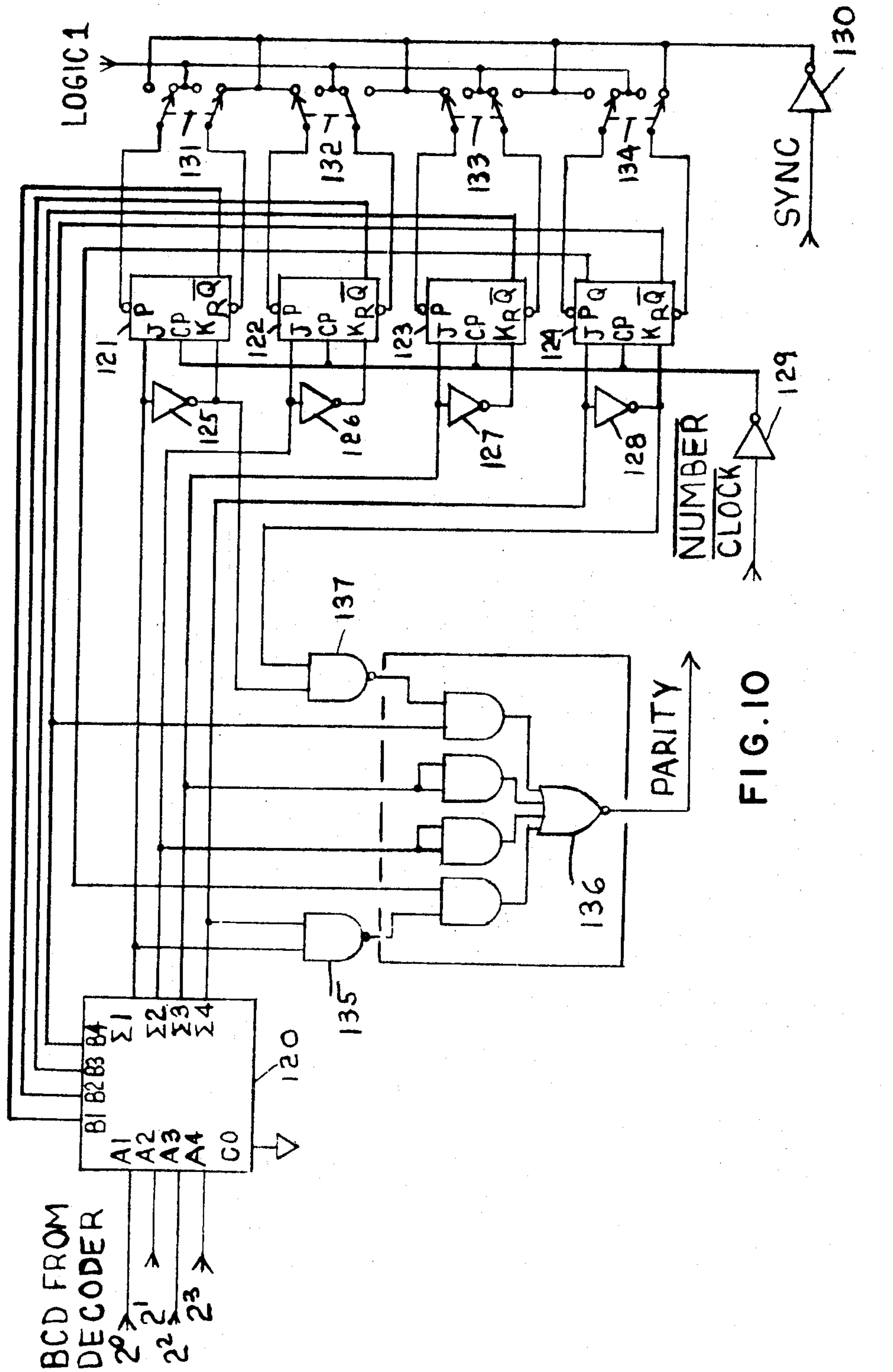
FIG. 10 is a logic diagram for parity check logic.

FIG. 10 shows the arrangement of parts comprising parity detector 6. Adder 120 is a four bit binary adder which sums the $\overline{Q}$ outputs of flip-flops 121 through 124 with binary coded decimal inputs from decoder 5. Inverters 125 through 128 provide the K inputs to said flip-flops so that the sum outputs of adder 120 can be shifted into said flip-flops by a clock pulse from inverter 129. The output of inverter 130 is applied via double pole double throw switches 131 through 134 to preset or reset flip-flops 121 through 124. In this manner an arbitrary number can be included in the parity check as means for rejecting patterns intended for unrelated information sytems. 16 separable information systems with the same apparent pattern format can be obtained by this means. In operation each new decimal digit is summed with the complement of the previous sum. This manipulation is similar to an alternate adding and subtracting of each decimal digit comprising the information number. This form of parity check detects manual entry transposition errors which may occur when a pattern is illegible and the operator must resort to keyboard entry of data. Parity is indicated when the output from adder 120 has the decimal value zero or nine depending upon whether the contents of flip-flops 121 through 128 represent numbers less than eight or greater than seven. If the B4 input to adder 120 is zero the adder output must be nine to indicate parity. The output of nand gate 135 is then zero and gate 136 employed as a negative logic nand gate produces a one output. However if the B4 input to adder 120 is a one, the adder output must be zero. Nand gate 137 responding to the outputs of inverters 125 and 128 then has a zero output and negative logic nand gate 136 indicates parity. The use of two parity numbers is necessary because a decimal input number can not always be selected for summing with any hexadecimal number to produce an arbitrary result.

Figure 11:
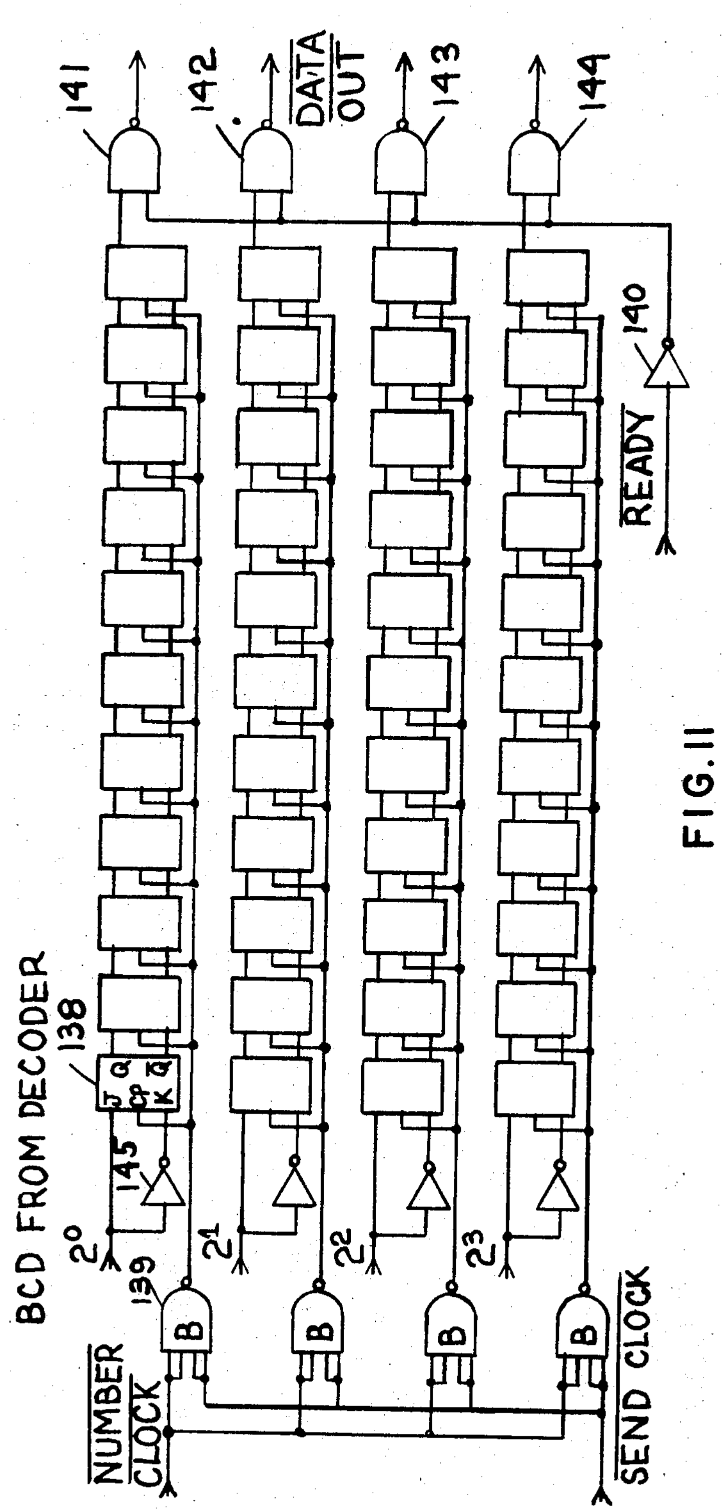
FIG. 11 is a logic diagram for data storage registers.

FIG. 11 shows the arrangement of parts comprising BCD number registers 7. 44 flip-flops typified by flip-flop 138 are arranged conventionally to make four shift registers of the serial-in-serial out type having a capacity of 11, binary-coded-decimal numbers. Buffer nand gates typified by gate 139 respond to either of two input lines to provide clocking pulses with each buffer gate driving all eleven flip-flops in one of the four registers. Inverters, typified by inverter 145, satisfy the requirement to provide complementary data inputs to the first flip-flop in each of the four registers. The $\overline{\text{READY}}$ signal is complemented by inverter 140 to enable nand gates 141 through 144 thereby effecting transmission of complemented data to an external device.

Figure 13:
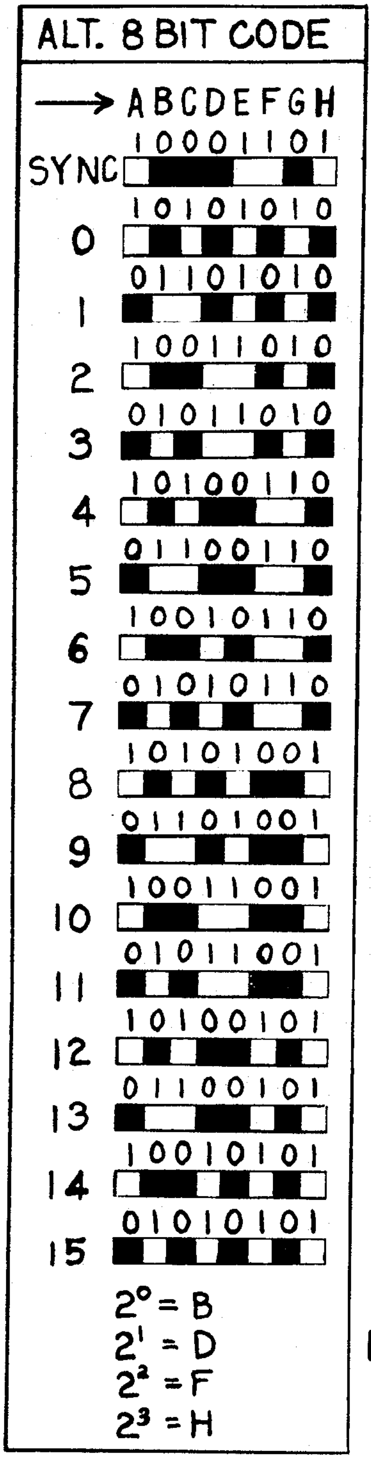
FIG. 13 is a chart showing an alternate eight bit, pattern encoding scheme.
Figure 12:
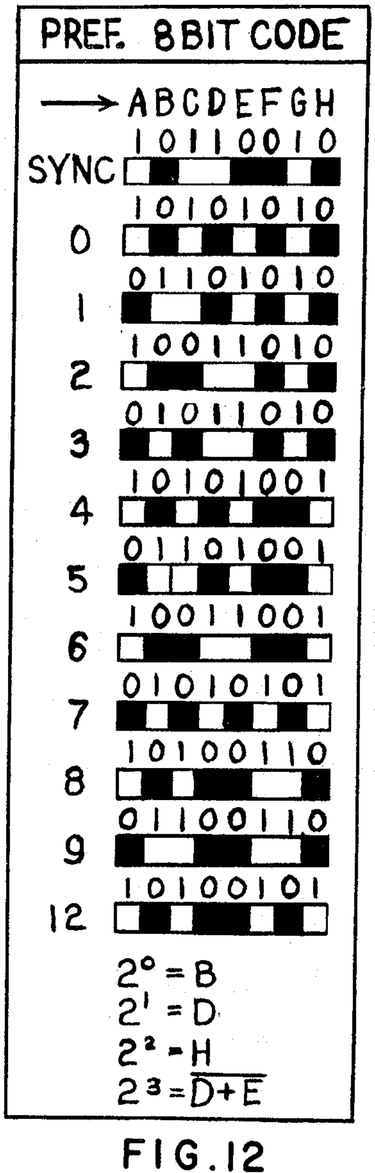
FIG. 12 is a chart showing a preferred eight bit, pattern encoding scheme.
Figure 14:
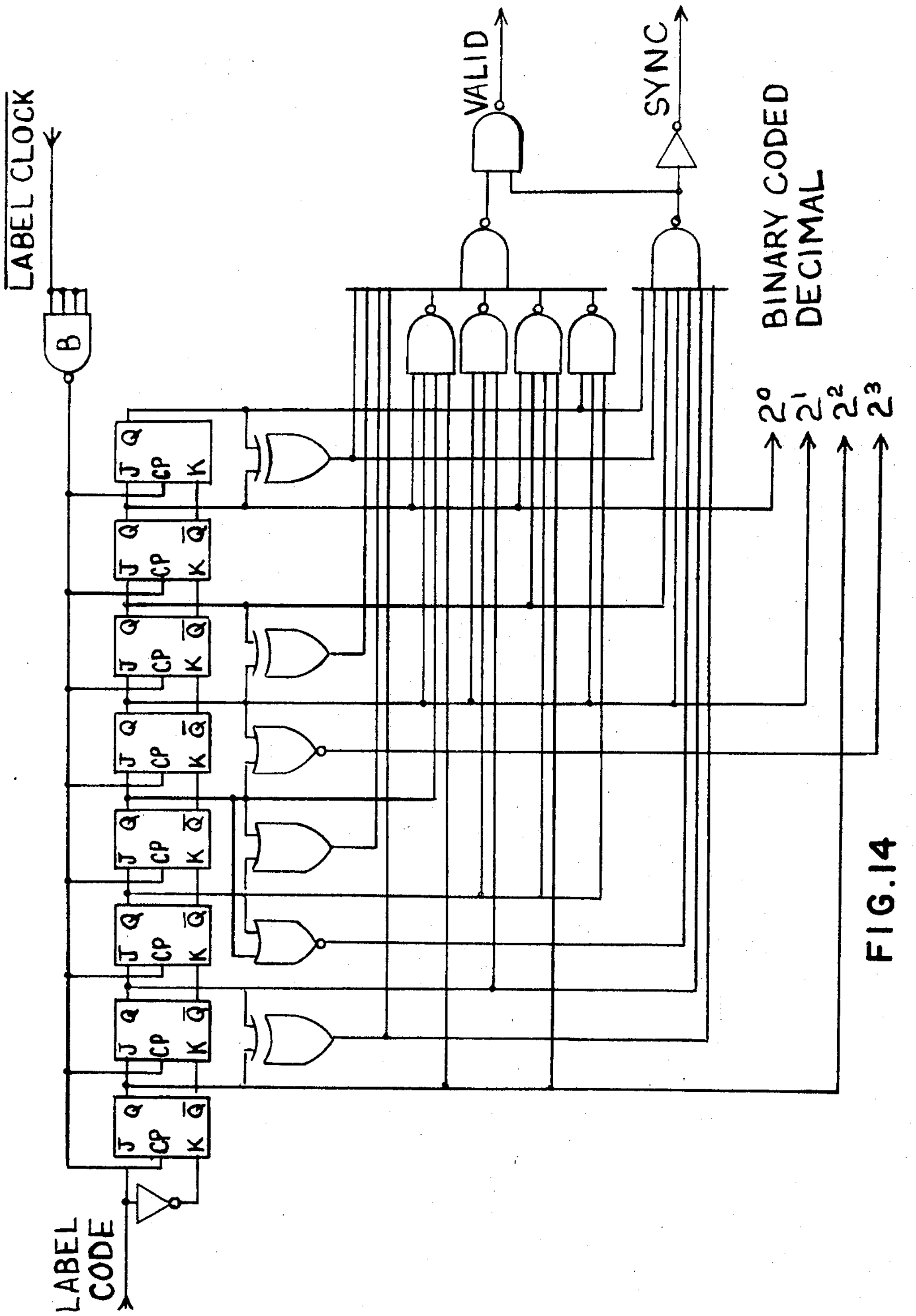
FIG. 14 is a logic diagram showing a decoder for the encoding scheme of FIG. 12.
Figure 15:
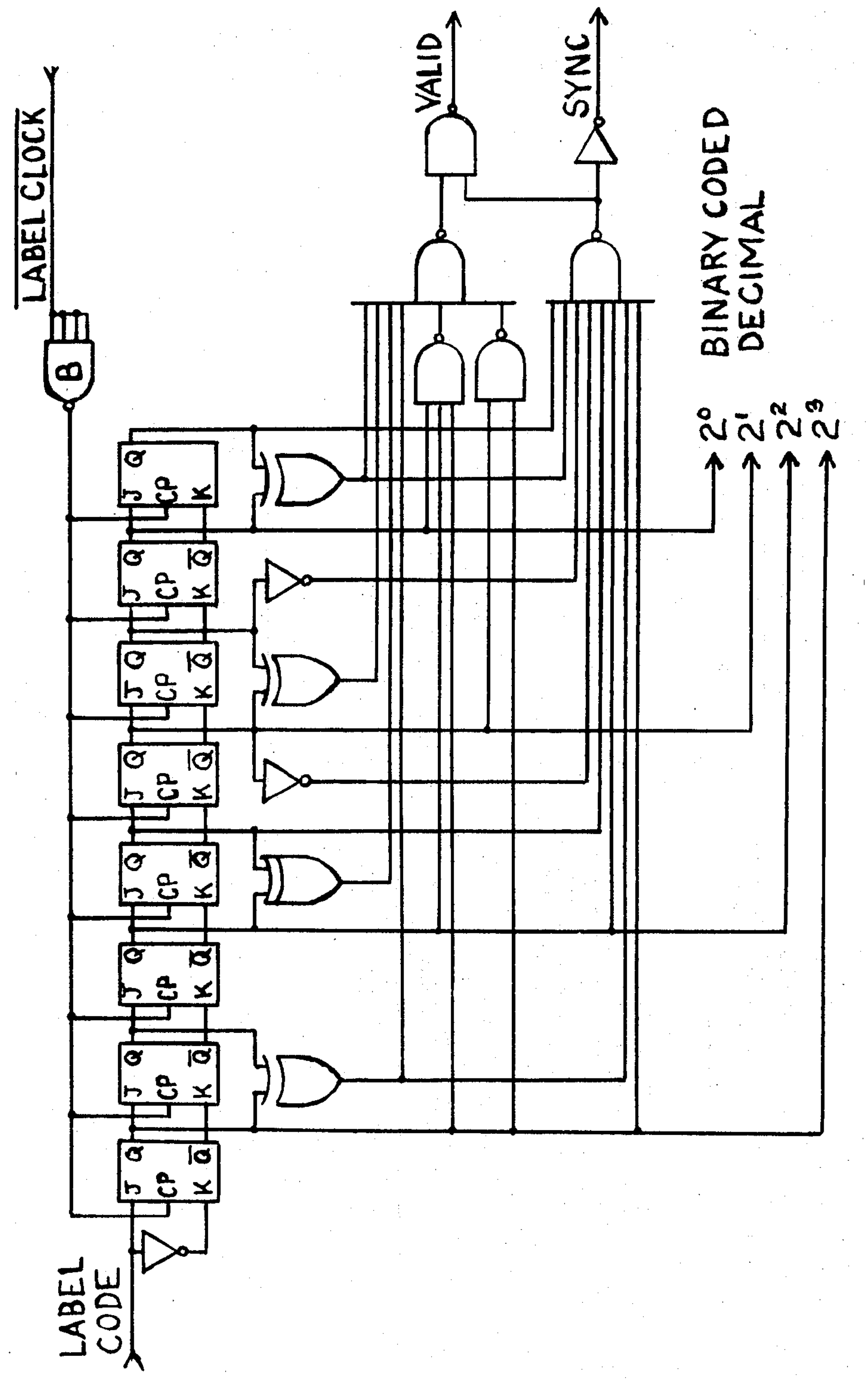
FIG. 15 is a logic diagram showing a decoder for the encoding scheme of FIG. 13.

Modifications to the reading apparatus described herein can readily be devised by those skilled in the art to accommodate other encoding schemes such as those shown in FIG. 12 and FIG. 13. FIG. 12 shows a preferred eight bit pattern. FIG. 13 shows an alternate encoding scheme having sixteen usable encoding sequences. FIG. 14 shows a decoder configuration that is compatible with the encoding scheme of FIG. 12. FIG. 15 shows a decoder scheme that is compatible with twelve of the coding sequences shown in FIG. 13.

Use of the invention is relatively simple; the operator need exercise only moderate diligence in positioning viewer 1 in contact with a patterned area to effect a reading. When alerted by a tone or other means the operator can transfer attention to another pattern. He need actuate no buttons or switches to effect a reading. A repeat reading of one pattern does not occur unless the viewer is momentarily separated from the pattern and then restored.

Since certain changes may be made in the above apparatus without departing from the scope of the invention herein involved, it is intended that all matter contained in the above description or shown in the accompanying drawings shall be interpreted in an illustrative and not in a limiting sense.

Other embodiments will occur to those skilled in the art and are within the following claims:

What is claimed is:

1. A label reading system for reading a circular coded label with a scan path within a predetermined alignment tolerance range between said circular label and scan path comprising:

means for scanning said label and producing label code signals representing the encoded information;

a clock pulse generator for generating clock pulses;

a clock control circuit for controlling the frequency of said clock pulse generator; and a variable synchronizing circuit responsive to said label code signals and to said clock pulses, for producing a phase signal representative of the difference in phase between said clock pulses and said label code signals, said clock control circuit being responsive to said phase signal to vary the frequency of said clock pulse generator to synchronize said clock pulses with said label code signals as said label code signals vary within said tolerance range.

2. The system of claim 1 in which said clock pulse generator includes means fo selecting every other clock pulse to form a digital clock pulse signal and the alternate clock pulse to form a label clock pulse signal, and said synchronizing unit includes a first gate responsive to said label code signal and said digit clock pulse signal and a second gate responsive to said label code signal and said label clock pulse signal.

3. The system of claim 2 in which said labels include a number of sectors of coded information and said digit clock pulse signals align approximately withthe transitions between sectors and said label clock pulse signals align approximately with the centers of said sectors.

4. The system of claim 1 further including a pulse rate detector responsive to said clock pulse generator for determining the difference between the frequency of said clock pulse and a predetermined reference level and providing a signal representative thereof to said clock control circuit for establishing a stabilized frequency for said clock pulse generator during non-label reading periods.

5. The system of claim 1 in which said synchronizing circuit includes means responsive to said phase signal, for averaging the effect of differences between the frequency of said label code signals and clock pulse on said clock control circuit and clock pulse generator to permit said clock pulse generator to hold its frequency during occasional absences of a label code signal and to accommodate minor variations in width of said sectors.

6. The system of claim 1 in which a said label include a plurality of sectors having either one of two contrasting states, and further including a no-label detection circuit for determining that a label reading cycle has been ended including gate means responsive to said clock pulses for passing label code signals of a first of said states, counter means responsive to said gate means for counting the number of contiguous label code signals in said first state, means for resetting said counter means upon each occurrence of a label code signal of the second state, and means, responsive to a predetermined count of label code signals in said first state in excess of the number of such label code signals in said first state normally occurring in the code used on the label, for indicating that a label is no longer being read.

7. A label reading system for reading a circular coded label with a scan path within a predetermined alignment tolerance range between said circular label and scan path comprising:

means for scanning said label and producing label code signals representing the encoded information;

a clock pulse generator for generating clock pulses;

a clock control circuit for controlling the frequency of said clock pulse generator;

a no-label detection circuit for determining that a label reading cycle has been ended including gate means responsive to said clock pulses for passing label code signals of a first of said states, counter means responsive to said gate means for counting the number of contiguous label code signals in said first state, means for resetting said counter means upon each occurrence of a label code signal of the second state, and means, responsive to a predetermined count of label code signals in said first state in excess of the number of such label code signals in said first state normally occurring in the code used on the label, for indicating that a label is no longer being read;

means responsive to said means for scanning, for accumulating label code signals representative of a group of sectors, means for determining whether such a group has a number of sectors in the first state equal to the number of sectors in the second state, and means for determining that there are no more than two sectors of the same state contiguous to one another;

said label including a plurality of sectors having either one of two contrasting states and a start grouo and a plurality of data groups, each including an equal number of sectors having either one of two states.

8. The system of claim 7 further including means for storing label code signals representative of groups of sectors, and means, responsive to said no-label detection circuit, for preventing reading out of said label code signals from said means for storing in the absence of an indication from said no-label detection circuit that said label code signals were accumulated following a no-label detection period.

9. A label reading system for reading a circular coded label with a scan path within a predetermined alignment tolerance range between said circular label and scan path comprising:

means for scanning said label and producing label code signals representing the encoded information;

a clock pulse generator for generating clock pulses;

a clock control circuit for controlling the frequency of said clock pulse generator;

said label including a series of groups of sectors including a plurality of data groups and a parity group, each group including an equal number of sectors representing a number;

said system further including a parity checking circuit including adder means, means for storing a number, means for placing a first number in said means for storing, means for presenting a series of numbers, corresponding to said series of groups, one at a time to one input of said adder, means for supplying at the other input of said adder the complement of the number stored in said means for storing, means for loading into said means for storing the sum produced by said adder, and means following the processing of said series of numbers corresponding to said series of groups including a plurality of data groups and a parity group for indicating whether parity is achieved.

10. The system of claim 9 in which said means for placing a first number in said means for storing includes a preselection circuit for placing a base number in said means for storing prior to processing said series of numbers.

* * * * *